US012552544B2

(12) United States Patent
Mcintire et al.

(10) Patent No.: US 12,552,544 B2
(45) Date of Patent: Feb. 17, 2026

(54) GEAR REACTION DERIVED TORQUE MEASUREMENT

(71) Applicant: Bell Textron Inc., Fort Worth, TX (US)

(72) Inventors: Austin Thomas Mcintire, Fort Worth, TX (US); Brian Joseph Roppolo, Fort Worth, TX (US); Eric Stephen Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 281 days.

(21) Appl. No.: 18/507,774

(22) Filed: Nov. 13, 2023

(65) Prior Publication Data

US 2025/0153856 A1    May 15, 2025

(51) Int. Cl.
| | |
|---|---|
| *G01L 5/12* | (2006.01) |
| *B64D 35/00* | (2006.01) |
| *G01L 3/10* | (2006.01) |
| *G01M 13/022* | (2019.01) |

(52) U.S. Cl.
CPC ............... *B64D 35/00* (2013.01); *G01L 3/10* (2013.01); *G01L 5/12* (2013.01); *G01M 13/022* (2013.01)

(58) Field of Classification Search
CPC ........................................................ G01L 5/12
See application file for complete search history.

(56) References Cited

U.S. PATENT DOCUMENTS

| | | | |
|---|---|---|---|
| 2,444,363 A | 6/1948 | Newcomb | |
| 2,578,474 A | 12/1951 | Lionel et al. | |
| 3,504,539 A | 4/1970 | Barlow | |
| 5,054,716 A * | 10/1991 | Wilson | B64D 35/00 244/66 |
| 10,587,103 B2 * | 3/2020 | Jarrett | B64C 27/14 |
| 11,161,606 B2 | 11/2021 | Olson | |
| 2017/0131161 A1 * | 5/2017 | Arslan | G01L 5/0019 |
| 2021/0214076 A1 * | 7/2021 | Olson | B64C 29/02 |

* cited by examiner

*Primary Examiner* — Alexander A Mercado
(74) *Attorney, Agent, or Firm* — Bradley Arant Boult Cummings LLP

(57) ABSTRACT

A rotorcraft propulsion system includes a mast coupled to a rotor assembly, a gear coupled to the mast, the gear during use producing an axial reaction force, a flexure shaft extending from the gear, where the flexure shaft does not rotate with the gear and the flexure shaft flexes in response to radial loads from the gear, and a load cell on the flexure shaft to measure the axial reaction force.

20 Claims, 6 Drawing Sheets

GEAR REACTION DERIVED TORQUE MEASUREMENT

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to aircraft propulsion systems, and more particularly, but not by way of limitation, to measuring the propulsion system torque of a rotorcraft during flight.

BACKGROUND

This section provides background information to facilitate a better understanding of the various aspects of the disclosure and the statements in this section are to be read in this light, and not as admissions of prior art.

Rotorcraft propulsion assemblies include a propulsion system that transfers rotational energy from a power source, such as an engine, to a rotor. Rotorcraft propulsion systems include a mast, which typically extends from a transmission and terminates at a rotor hub from which a number of rotor blades radially extend. The transmission may include planetary gear systems, pinion gears, bull gears or any other type of gear to transmit rotational energy from the power source to the rotor hub. Propulsion assemblies also typically include a standpipe through which wires or other devices may pass to provide communication between the rotor hub and other rotorcraft systems.

It is desirable to measure drive system torque while in flight. The measurement of torque, generally mast torque allows for a more accurately sized drive system and therefore decreased weight. Mast torque sensing relies for example on strain gauges inside of the mast. These sensing systems require costly and time consuming calibration of the mast and a slip ring to transmit data from the strain gauges to the flight computer. Engine torque is measured at the engines therefore one torque measurement must be takin in either the tail rotor power train or main rotor power train in order to provide an accurate estimate of the torque at the main rotor mast. Engine torque measurement systems can use sensors measuring torsional windup through a tail rotor drive shaft. Error can be introduced through airframe deflection and temperature and material variation.

SUMMARY

An exemplary rotorcraft propulsion system includes a mast coupled to a rotor assembly, a gear coupled to the mast, the gear during use producing an axial reaction force, a flexure shaft extending from the gear, where the flexure shaft does not rotate with the gear and the flexure shaft flexes in response to radial loads from the gear, and a load cell on the flexure shaft to measure the axial reaction force.

An exemplary rotorcraft includes a propulsion assembly coupled to a fuselage, the propulsion assembly including a mast coupled to a rotor assembly, a gear coupled to the mast, the gear during use producing an axial reaction force, a flexure shaft extending from the gear, wherein the flexure shaft flexes in response to radial loads from the gear, a ball bearing rotationally coupling the gear to the flexure shaft, wherein the ball bearing is configured to transfer the axial reaction force and radial loads from the gear to the flexure shaft, and a load cell on the flexure shaft to measure the axial reaction force.

An exemplary method includes operating a propulsion system to maintain a rotorcraft in flight, the propulsion system including a mast coupled to a rotor assembly, a gear coupled to the mast and producing an axial reaction force, a flexure shaft extending from the gear, a ball bearing rotationally coupling the gear to the flexure shaft and transferring the axial reaction force and radial loads from the gear to the flexure shaft, wherein the flexure shaft flexes in response to the radial loads, measuring the axial reaction force on the flexure shaft and during the flight, and determining a torque of the gear using the axial reaction force.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
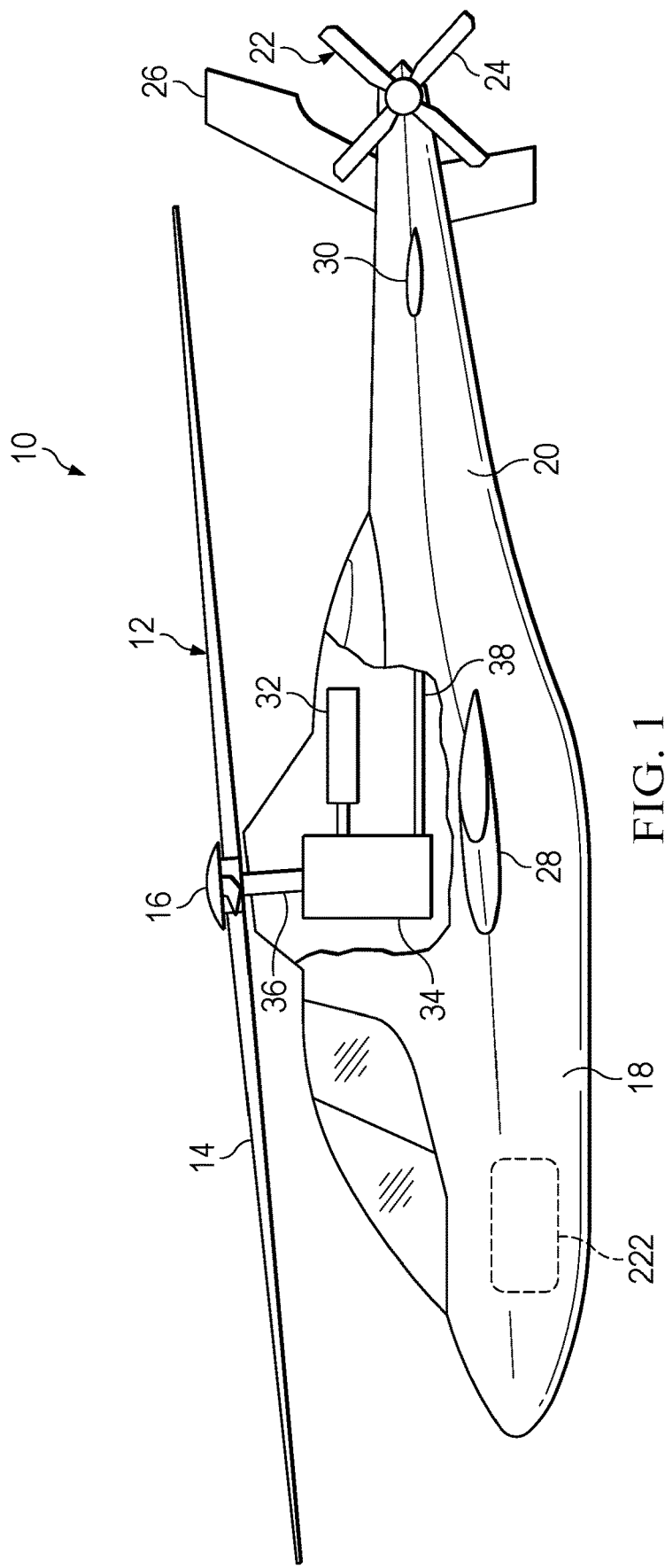
FIG. 1 illustrates an exemplary rotary aircraft implementing a gear reaction derived torque measurement of a propulsion system according to aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Referring to FIG. 1, a rotary aircraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust, and lift of helicopter 10. A tail boom 20 is coupled to fuselage 18 and extends from fuselage 18 in the aft direction. An anti-torque system 22 includes a tail rotor assembly 24 coupled to an aft end of tail boom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provides stabilization to helicopter 10 during high-speed forward flight. In addition, helicopter 10 includes wing members 28 that extend laterally from fuselage 18 and wing members 30 that extend laterally from tail boom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38.

Figure 2A:
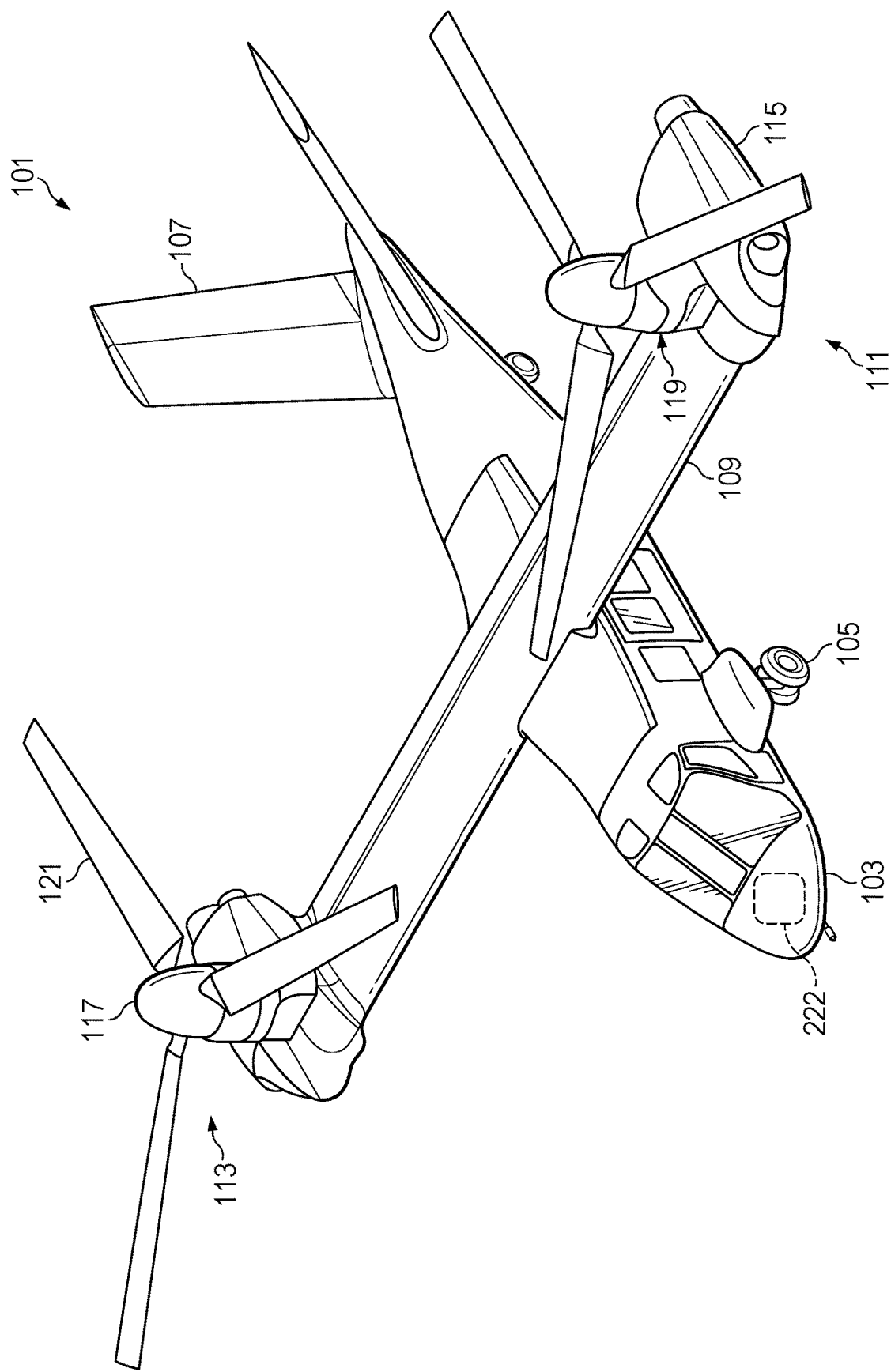
FIG. 2A illustrates an exemplary tiltrotor aircraft in a helicopter mode implementing a gear reaction derived torque measurement of a propulsion system according to aspects of the disclosure.
Figure 2B:
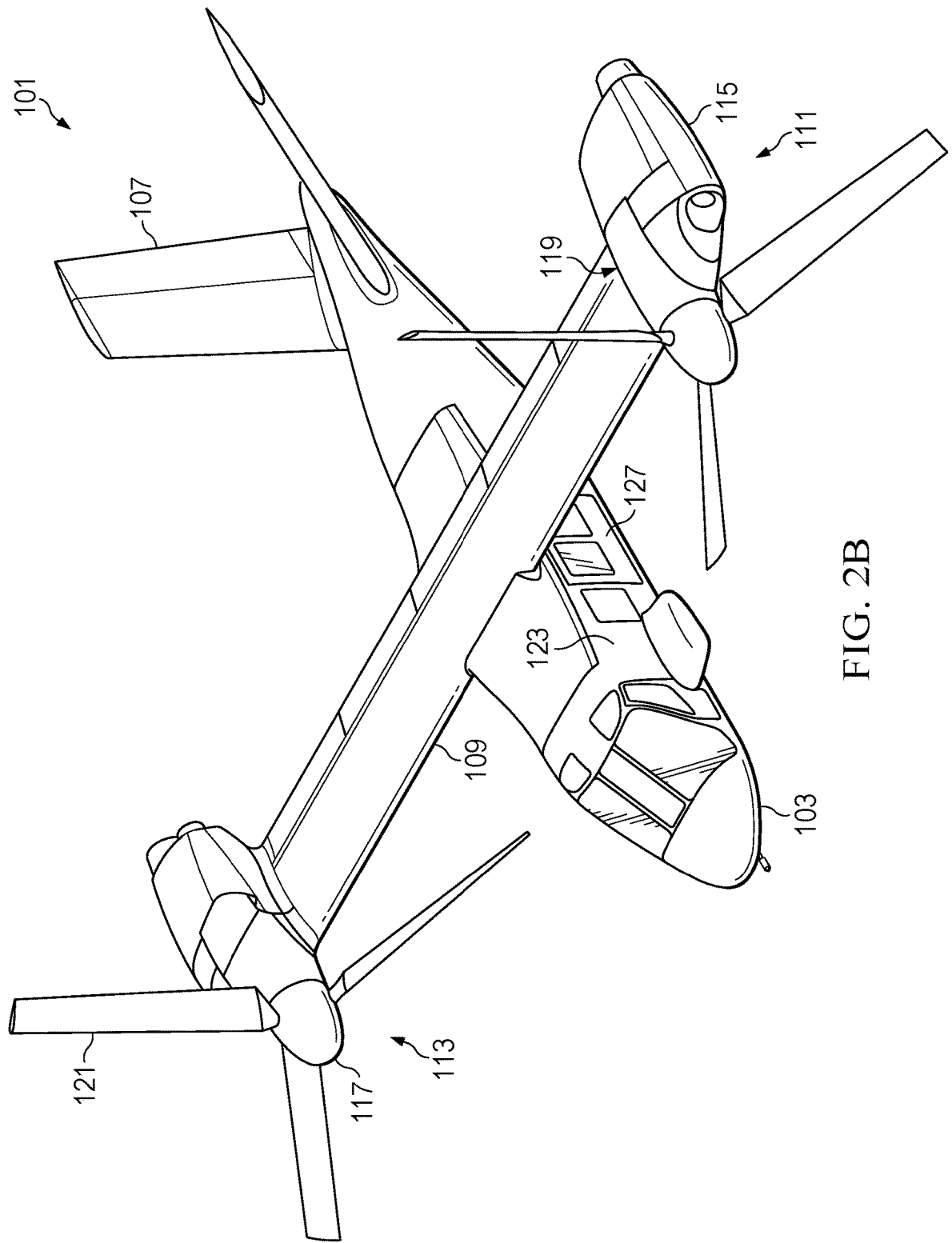
FIG. 2B illustrates an exemplary tiltrotor aircraft in an airplane mode implementing a gear reaction derived torque measurement of a propulsion system according to aspects of the disclosure.

Referring to FIGS. 2A and 2B, a tiltrotor aircraft is schematically illustrated and generally designated 101. Tiltrotor aircraft 101 includes a fuselage 103, landing gear 105, a tail member 107, a wing 109, a propulsion system 111, and a propulsion system 113. Each propulsion system 111, 113 includes a fixed engine 115 and a proprotor 117. Propulsion, or drive, systems 111, 113 each include a pylon 119 that is rotatable between a generally vertical orientation, as best seen in FIG. 2A, and a generally horizontal position, as best seen in FIG. 2B. Each proprotor 117 has a plurality of rotor blades 121. The position of proprotors 117, as well as the pitch of rotor blades 121, can be selectively controlled in order to selectively control direction, thrust, and lift of tiltrotor aircraft 101.

Rotorcrafts 10 and 101 are merely illustrative of a variety of aircraft that can implement the embodiments disclosed herein. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the centrifugal force spherical bearing of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 3:
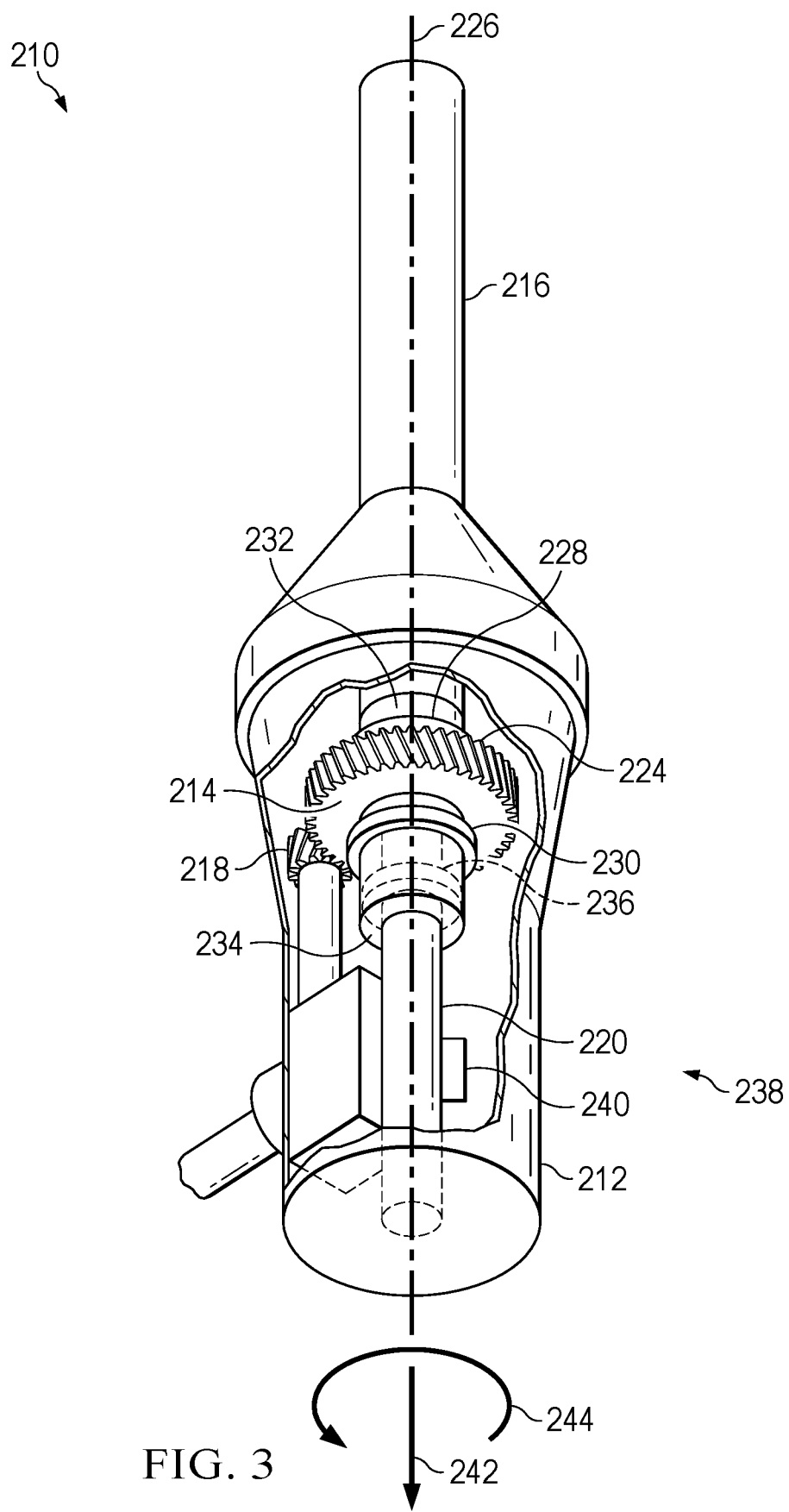
FIG. 3 illustrates an exemplary gearbox of an exemplary rotorcraft propulsion system implementing a gear reaction derived torque measurement.
Figure 4:
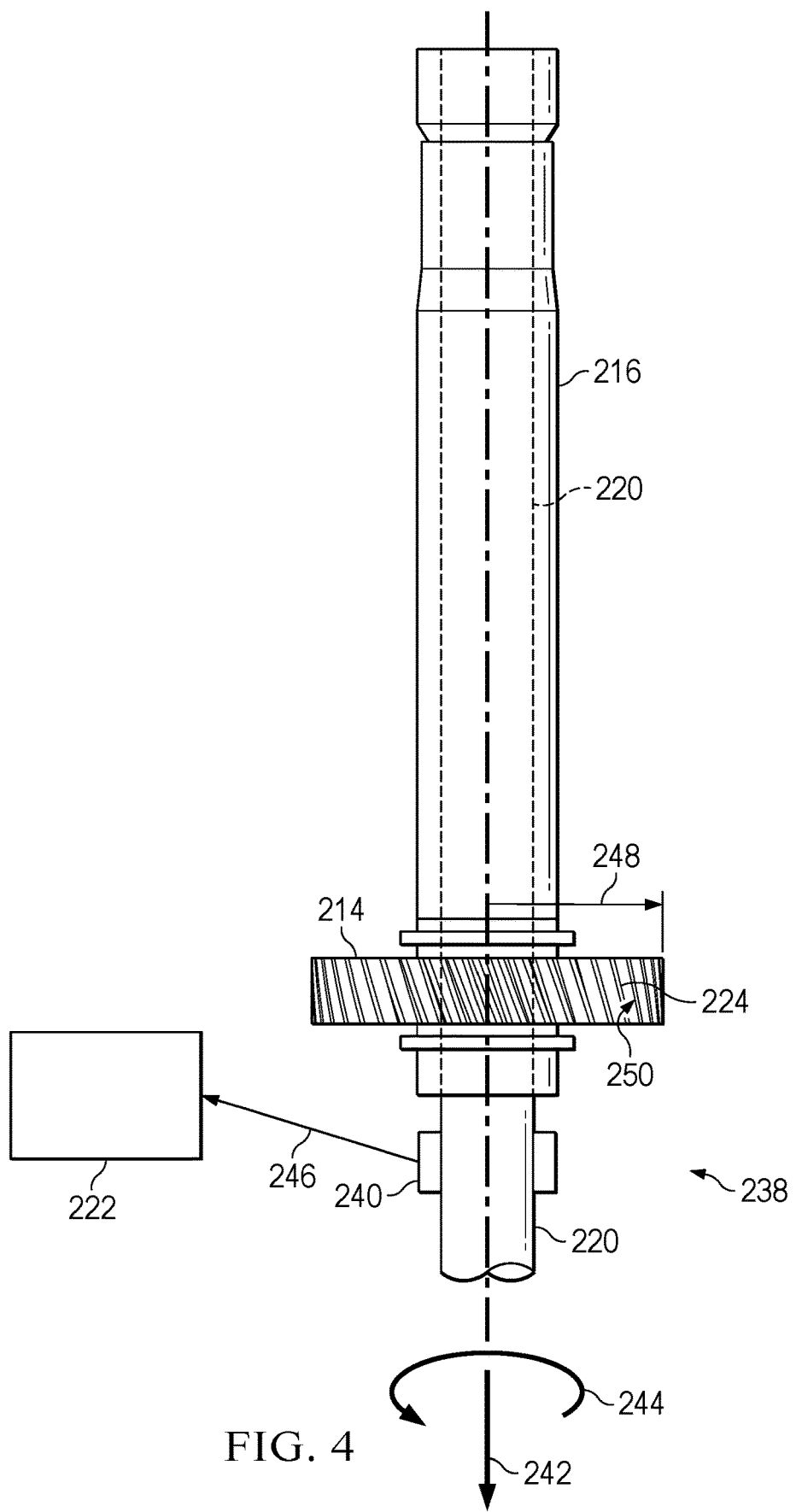
FIG. 4 illustrates an exemplary rotorcraft propulsion system implementing an exemplary gear reaction derived torque measurement system.
Figure 5:
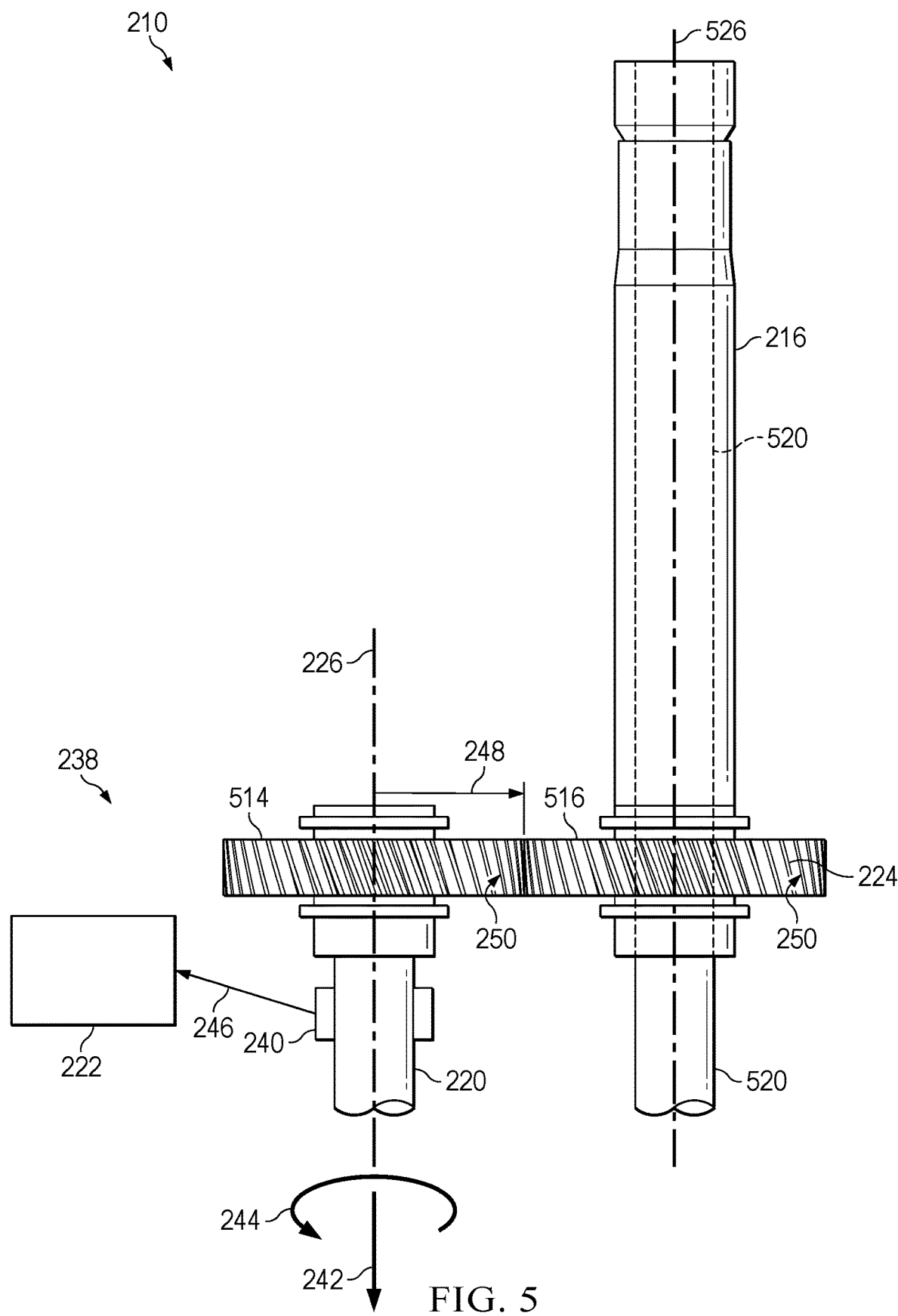
FIG. 5 illustrates another exemplary rotorcraft propulsion system implementing an exemplary gear reaction derived torque measurement system.

FIGS. 3-5 illustrate exemplary embodiments of a torque measurement system 238 utilized in an exemplary rotorcraft drive system 210. The rotorcraft drive system have gears that transfer torque to the mast and that produce an axial reaction force. The torque measurement system 238 utilizes a measurement of the axial reaction force obtained at a flexure shaft connected to one of the axial reaction force producing gears to determine a drive system torque. The axial reaction force gear is described with reference to FIGS. 3 and 4 as a bull gear 214 that is coaxial with the mast 216, however, as will be understood by those skilled in the art with reference to this disclosure the axial reaction force gear, or output gear, may be any gear in the rotorcraft drive system that produces an axial reaction force. Accordingly, the axial reaction force gear is not necessarily coaxial with the mast or directly coupled to the mast as illustrated in the exemplary embodiment of FIG. 5.

FIG. 3 illustrates an exemplary embodiment of a gearbox, or transmission, 212 of an exemplary rotorcraft drive system 210 such as main rotor assembly 12 of rotorcraft 10 of FIG. 1 or propulsion systems 111, 113 of aircraft 101 of FIGS. 2A, 2B.

Included within rotor gearbox 212 is a bull gear 214 coupled to a mast 216. Bull gear 214, an output gear, may mate with a pinion gear 218, an input gear, that provides rotational energy to bull gear 214, which in turn provides rotational energy to mast 216. It will be appreciated by one of ordinary skill in the art that bull gear 214 may alternatively be a pinion gear or any other type of gear that transmits rotational energy to mast 216, either directly or indirectly. Thus, bull gear 214 may also be referred to as an axial reaction force gear and include a gear that is coupled to the mast, but not directly coupled to the mast, such as pinion gear 218. A flexure shaft 220 extends through bull gear 214 and does not rotate with bull gear 214. In FIGS. 3-4, flexure shaft 220 is coaxially aligned with the mast. In some embodiments, flexure shaft 220 is a standpipe through which wires and/or other devices may pass through to provide communication between the rotor hub or proprotor assembly and other systems such as the flight control computer 222 (FIGS. 1, 2A, 4). Flexure shaft 220 in FIG. 3 is generally referred to herein as a standpipe and it will be understood by those with skill in the art that the term standpipe will include a shaft coaxially aligned with the mast and extending through the output gear even if it does not pass wires or other devices.

In operation, axial reaction force gear 214 may be subject to both axial and radial loads. The axial loads experienced by axial reaction force gear 214 may be caused by the use of gear teeth 224 on both axial reaction force gear 214 and the complementary input gear 218. The illustrated gear teeth 224 are helical. In other embodiments instead of the gear being a helical gear it may be a bevel gear, a spiral bevel gear, a hypoid gear, or any other type of gear that has an axial reaction load 242. When bull gear 214 experiences axial loads, axial reaction force gear 214 imparts that load to flexure shaft 220 along axis 226. Forward and aft roller bearings 228, 230 are coupled to forward and aft collars 232, 234 of axial reaction force gear 214, respectively, to absorb the radial loads from axial reaction force gear 214. A ball bearing 236 interposed between flexure shaft 220 and aft collar 234 of axial reaction force gear 214 transmits the axial reaction force 242 of bull gear 214 along axis 226 to flexure shaft 220. Bull gear 214 is rotatably coupled to flexure shaft 220 via ball bearing 236. While ball bearing 236 is intended to accommodate the axial loads of axial reaction force gear 214, radial loads from axial reaction force gear 214 are also transmitted from axial reaction force gear 214 to flexure shaft 220 via ball bearing 236. Previous attempts to address the radial loads transmitted through a ball bearing in a roller-roller-ball bearing configuration have resulted in various drawbacks including fretting of the ball bearing and unduly complex or costly structures. The illustrative embodiments address these drawbacks by including flexure shaft 220, which flexes in response to radial loads transmitted through ball bearing 236 from gear 214. Exemplary aspects of a flexure standpipe implemented in a propulsion system is disclosed in U.S. Pat. No. 11,161,606, the teachings of which are incorporated herein by reference.

With additional reference to FIGS. 4 and 5, the propulsion, or drive, torque measurement system 238 includes one or more load cells 240 mounted to a flexure shaft 220. Load cells convert a force into a quantifiable output such as an electrical signal. Types of load cells include, without limitation, strain gauges, capacitive load cells, and piezoelectric transducers. Load cell 240 measures the axial reaction force 242 from rotation of bull gear 214 and is indicative to the drive system torque 244. Load cells 240 are in communication with flight computer 222 via path 246, e.g., wires and/or wireless, to communicate the axial reaction force measurement and/or the torque derived from the axial reaction force via a processor at load cell 240. In a non-limiting example, drive system torque 244 applied to mast 216 is determined using the measured axial reaction force 242 with the known pitch radius 248 of axial reaction force gear and the helix angle 250 of the gear teeth 224.

FIG. 5 illustrates portions of another exemplary rotorcraft drive system 210 implementing an exemplary torque measurement system 238. In this embodiment, measurement of axial reaction load 242 is taken from an axial reaction force gear 514 that is not coaxial with mast 216. Axial reaction force gear 514 includes a flexure shaft 220 that is coaxial with gear 514. Gear 514 meshes via teeth 224 with gear 516, e.g., a bull gear, that is directly connected to mast 216. In this example, gear 516 includes a standpipe 520 arranged as a flexure standpipe 520. Axis 226 of gear 514 does not have to be parallel with the axis 526 of mast 216 as illustrated in FIG. 5.

According to aspects of this disclosure, an axial helical or spiral gear reaction force can be measured through radially compliant bearing support. The load cell can be located with a non-rotating component eliminating the need for a slip ring and reducing the weight of a torque measurement system. According to embodiments, the axial reaction force measurement and thus the torque measurement is internal to the gearbox and not influenced by the airframe deflections. The torque measurement system can accurately determine the drive system torque post accessory power take off resulting in less uncertainty in the measurement.

Although relative terms such as "outer," "outboard," "inner," "inboard," "upper." "lower." and similar terms have been used herein to describe a spatial relationship of one element to another, it is understood that these terms are intended to encompass different orientations of the various elements and components in addition to the orientation depicted in the figures. Furthermore, as used herein, the terms "connect." "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially." "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotorcraft propulsion system comprising:
   a mast coupled to a rotor assembly;
   a gear coupled to the mast, the gear during use producing an axial reaction force;
   a flexure shaft extending from the gear, wherein the flexure shaft does not rotate with the gear and the flexure shaft flexes in response to radial loads from the gear; and
   a load cell on the flexure shaft to measure the axial reaction force.

2. The rotorcraft propulsion system of claim 1, wherein the load cell is in communication with a processor to determine a torque of the gear based on the axial reaction force.

3. The rotorcraft propulsion system of claim 1, wherein the flexure shaft is coaxial with the gear and the flexure shaft is not coaxial with the mast.

4. The rotorcraft propulsion system of claim 1, wherein the flexure shaft is coaxial with the mast.

5. The rotorcraft propulsion system of claim 1, wherein the flexure shaft is a standpipe that extends through the mast to the rotor assembly.

6. The rotorcraft propulsion system of claim 1, wherein:
   the load cell is in communication with a processor to determine a torque of the gear based on the axial reaction force; and
   the flexure shaft is coaxial with the gear and the flexure shaft is not coaxial with the mast.

7. The rotorcraft propulsion system of claim 1, wherein:
   the load cell is in communication with a processor to determine a torque of the gear based on the axial reaction force; and
   the flexure shaft is coaxial with the mast.

8. The rotorcraft propulsion system of claim 1, wherein:
   the load cell is in communication with a processor to determine a torque of the gear based on the axial reaction force; and
   the flexure shaft is a standpipe that extends through the mast to the rotor assembly.

9. The rotorcraft propulsion system of claim 1, wherein the gear comprises a first roller bearing and a second roller bearing configured to absorb the radial loads from the gear; and a ball bearing interposed between the gear and the flexure shaft, the ball bearing configured to transfer the axial reaction force and the radial loads from the gear to the flexure shaft.

10. The rotorcraft propulsion system of claim 1, further comprising a ball bearing including inner and outer races interposed between the gear and the flexure shaft, the ball bearing configured to transfer the axial reaction force from the gear to the flexure shaft.

11. The rotorcraft propulsion system of claim 10, wherein the ball bearing transfers the radial loads from the gear to the flexure shaft.

12. The rotorcraft propulsion system of claim 10, wherein the gear further comprises a first collar and a second collar, wherein the ball bearing is interposed between the flexure shaft and the first collar.

13. The rotorcraft propulsion system of claim 12, further comprising a first roller bearing coupled to the first collar and a second roller bearing coupled to the second collar, the first roller bearing and the second roller bearing configured to absorb the radial loads from the gear and the ball bearing configured to transfer the radial loads to the flexure shaft.

14. A rotorcraft comprising:
a propulsion assembly coupled to a fuselage, the propulsion assembly comprising:
  a mast coupled to a rotor assembly;
  a gear coupled to the mast, the gear during use producing an axial reaction force;
  a flexure shaft extending from the gear, wherein the flexure shaft flexes in response to radial loads from the gear;
  a ball bearing rotationally coupling the gear to the flexure shaft, wherein the ball bearing is configured to transfer the axial reaction force and radial loads from the gear to the flexure shaft; and
  a load cell on the flexure shaft to measure the axial reaction force.

15. The rotorcraft of claim 14, wherein the flexure shaft is coaxial with the gear and the flexure shaft is not coaxial with the mast.

16. The rotorcraft of claim 14, wherein the flexure shaft is coaxial with the mast.

17. The rotorcraft of claim 14, wherein the flexure shaft is a standpipe that extends through the mast to the rotor assembly.

18. A method comprising:
operating a propulsion system to maintain a rotorcraft in flight, the propulsion system including a mast coupled to a rotor assembly, a gear coupled to the mast and producing an axial reaction force, a flexure shaft extending from the gear, a ball bearing rotationally coupling the gear to the flexure shaft and transferring the axial reaction force and radial loads from the gear to the flexure shaft, wherein the flexure shaft flexes in response to the radial loads;
measuring the axial reaction force on the flexure shaft and during the flight; and
determining a torque of the gear using the axial reaction force.

19. The method of claim 18, wherein the flexure shaft is coaxial with the gear and the flexure shaft is not coaxial with the mast.

20. The method of claim 18, wherein the flexure shaft is a standpipe that extends through the mast to the rotor assembly.

\* \* \* \* \*